United States Patent

[11] 3,622,213

| [72] | Inventor | Rudolph F. Onsrud |
| | | 833 Glenayre Drive, Glenview, Ill. 60025 |
| [21] | Appl. No. | 853,810 |
| [22] | Filed | Aug. 28, 1969 |
| [45] | Patented | Nov. 23, 1971 |

[54] SPHERICAL HYDROSTATIC BEARING
6 Claims, 7 Drawing Figs.

| [52] | U.S. Cl. | 308/122 |
| [51] | Int. Cl. | F16c 17/16 |
| [50] | Field of Search | 308/72, 122, 9 |

[56] References Cited
UNITED STATES PATENTS

| 2,578,712 | 12/1951 | Martellorti | 308/122 |
| 3,395,952 | 8/1968 | Deffrenne | 308/122 |
| 2,213,432 | 9/1940 | McCartney | 308/72 |
| 2,998,999 | 9/1961 | Morser et al. | 308/122 |
| 3,005,666 | 10/1961 | Morser et al. | 308/122 |
| 3,014,767 | 12/1961 | Thrasher et al. | 308/72 |

FOREIGN PATENTS

| 703,249 | 3/1941 | Germany | 308/72 |

Primary Examiner—Edgar W. Geoghegan
Assistant Examiner—Frank Susko
Attorney—Pendleton, Neuman, Williams & Anderson ABSTRACT: A hydrostatic spherical bearing structure is disclosed wherein a spherical runner is fixedly mounted on a shaft and an enveloping spherical member surrounds the spherical runner with a small clearance and is held in a support or housing. The enveloping spherical member consists of two ring bearing members facing each other. Lubricant under pressure of about 1,500 pounds per square inch is forced to flow into the clearance between the spherical runner and the enveloping surface of the ring bearing members through a series of symmetrically spaced openings in the ring bearing members thereby holding the spherical runner in a central position. Axial or radial deflections caused by corresponding deflections of the shaft of the spherical runner result in increased or balancing pressure being exerted against the spherical runner at the area opposite that where the deflecting force is applied. Under the influence of the balancing pressure, the spherical runner, and thus the shaft, returns to its central position, whether the deflection is radial or axial.

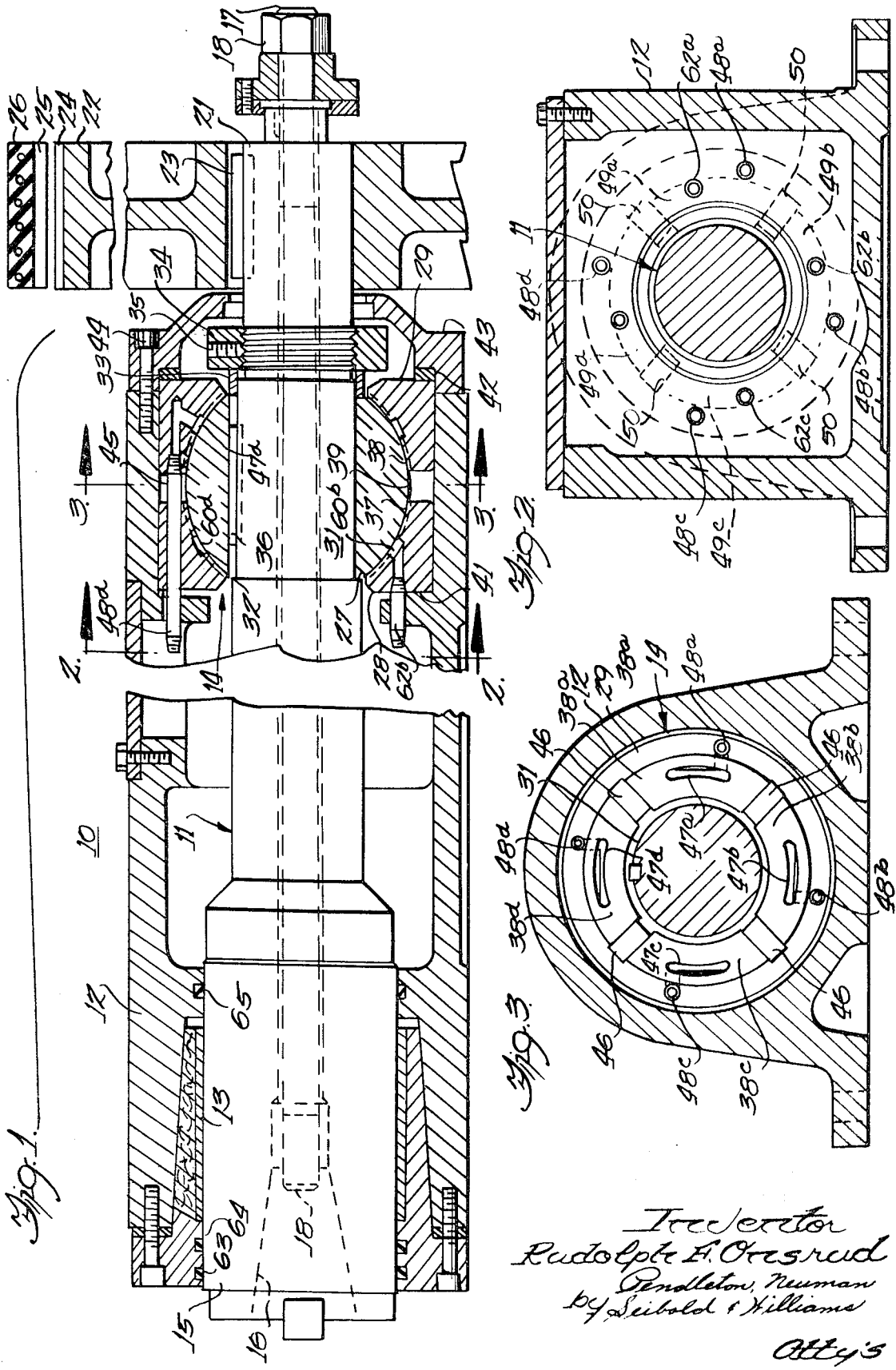

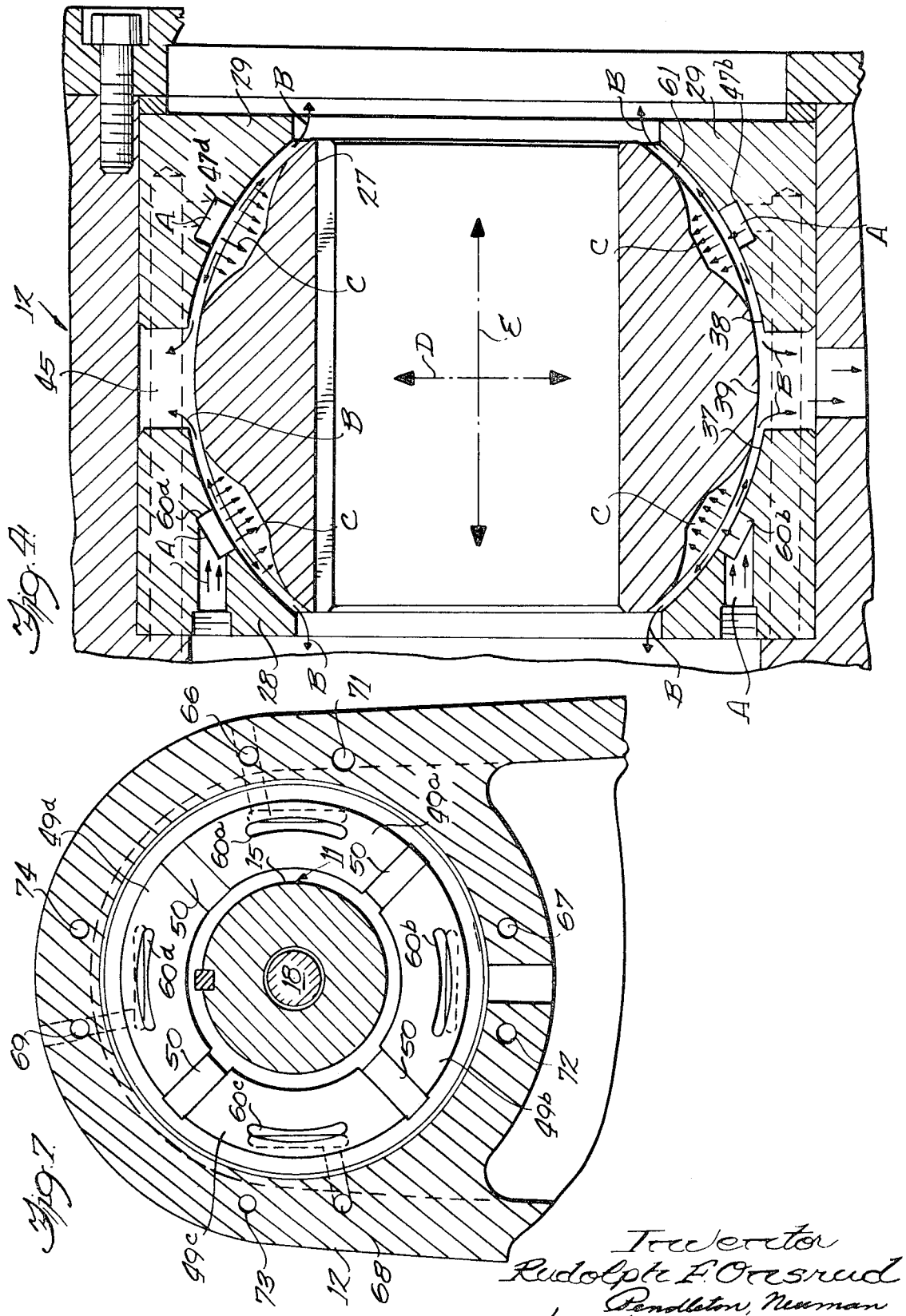

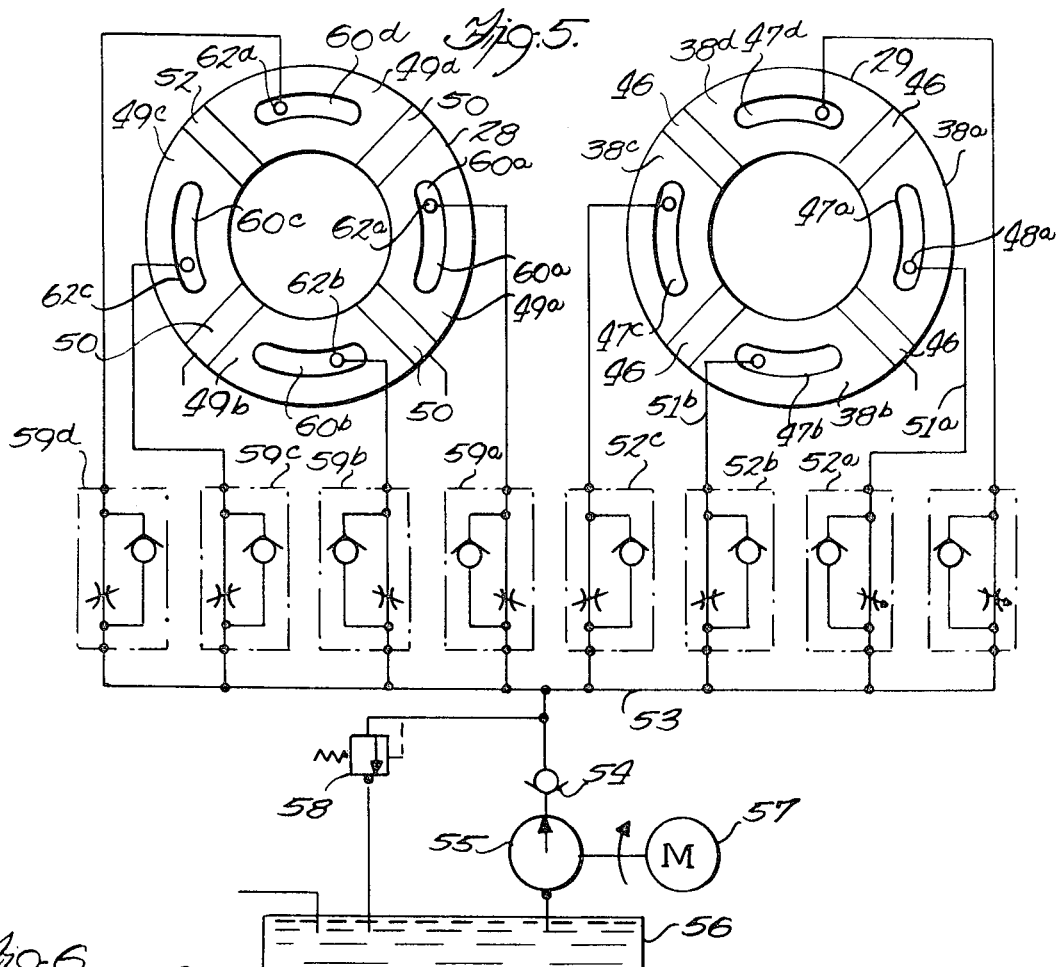
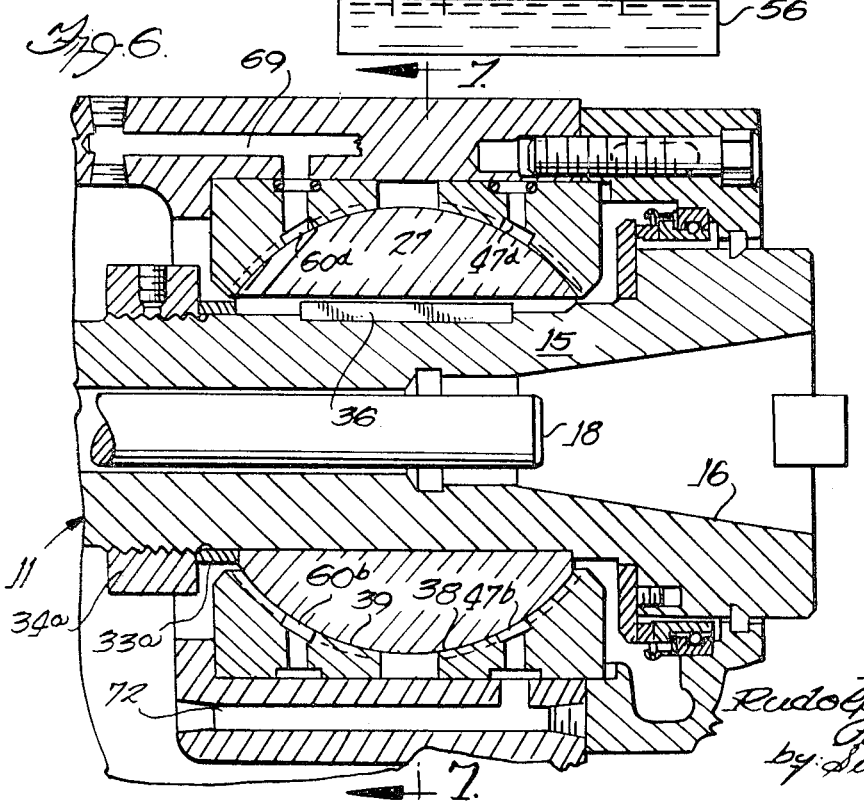

3,622,213

SPHERICAL HYDROSTATIC BEARING

BACKGROUND OF THE INVENTION

The field of the invention relates to hydrostatic bearings, more particularly to a hydrostatic bearing for handling axial and radial loads. It is an object of the invention to provide improved hydrostatic bearings of the indicated character.

The machining of hard metals to provide surface members for the wings and fuselages of supersonic aircraft, for example, has presented many problems to the machine tool and cutting tool manufacturing industry. In such aircraft, the wing surfaces are machined from solid pieces of metal such as titanium or titanium alloys, which metals are very hard and tough. In machining such solid pieces, the underside is machined to form ribs, both longitudinal and transverse, which remain as an integral part of the piece, thereby providing the greatest possible strength. Thereafter, the outerside side of the now hollowed out solid piece is machined to the very smooth and accurate, curved or flat surface required. The resulting piece consists of a thin skin with integral reinforcing ribs at the underside.

The wing surfaces of supersonic and other aircraft must be highly accurate in dimensions as well as possessing maximum strength. In forming pieces as described, it is evident that large amounts of metal must be removed and that the resultant finish must be highly smooth and accurate. Acceptably finished surfaces are measured in terms of a few micro inches of flatness, and it is necessary economically, if not otherwise, that such finishes must be produced by the machining operation. Accordingly, the requirements of strength, rigidity, accuracy and others extend through the machine tool, including the cutting implement and the bearing structures which support the spindles for driving the cutters. Conventional bearings such as ball, roller, sleeve or other have clearance to operate which constitutes play causing lateral and axial movement under corresponding loads. Such movement results in chatter and destruction of the cutting edge and work hardening of materials such as titanium alloys. As an example, ball bearings can be sprung from one-thousandth to two-thousandths of an inch.

Hydrostatic bearings wherein the spindle is supported by bearing surfaces between which exists a hydrostatic pressure, the latter being of the order of 1,500 pounds per square inch, enable the spindle to be held and maintained with sufficient rigidity to provide the necessary accuracy in machining finishes. Finishes of the order of 16 microinches r.m.s. have been achieved while increasing cutter life and production rate. A spherical hydrostatic bearing, according to the invention, enables such finishing accuracy and economy, not heretofore achievable, to be achieved for both radial and axial loads.

At the same time that accurate finishes are achievable, the amount of friction is lessened to a great degree because the hydrostatic pressure of the lubricating oil keeps the bearing parts separated from each other. There is no metal-to-metal contact of, but only a thin lubricant film between, the bearing surfaces.

Moreover, because the hydraulic pressure keeps the spindle centered or aligned in the bearing surfaces, a greater latitude of bearing bore misalignment than normally permissible may be allowable.

It is a further object of the invention to provide an improved hydrostatic bearing having spherical bearing surfaces for handling axial as well as radial loads.

It is a further object of the invention to provide a spherical hydrostatic bearing which is simple in form, easy to manufacture and efficient in operation.

SUMMARY OF THE INVENTION

The present invention is a spherical hydrostatic bearing for handling radial and axial loads applied between two relatively rotating members. A first bearing means having an exterior spherical bearing surface is adapted to be fixed to one of such relatively rotating members, a second bearing means having an interior spherical surface enveloping said exterior spherical bearing surface is adapted to be fixed to the other of such relatively rotating members, and at spaced areas between said exterior spherical bearing surface and said interior spherical bearing surface there are means for supplying balancing hydraulic pressure.

More specifically, the spherical hydrostatic bearing comprehends a spherical bearing member adapted to be fixed to a rotatable shaft and two ring bearing members each of which has an interior spherical surface portion for cooperation with a portion of said spherical bearing member. The ring bearing members are axially displaced relative to each other and are held in the housing with the interior spherical surface portion of one of the ring bearing members facing the interior spherical surface portion of the other one of the ring bearing members, thereby defining an enveloping interior spherical bearing surface to receive and confine said spherical bearing member for handling axial and radial loads. Each of said two ring bearing members include symmetrically spaced, hydraulic-pressure-opening means in the interior spherical surface portions thereof for supplying balancing hydraulic pressure between said spherical surface portions and the surface of said spherical bearing member. The hydraulic pressure supplied to the openings is from a pump forcing lubricants under pressure through flow control valves.

BRIEF DESCRIPTION OF THE DRAWINGS

Referring to the drawings, FIG. 1 is a sectional view showing a cutting tool spindle and drive structure embodying a spherical hydrostatic bearing according to the invention;

FIG. 2 is a sectional view taken substantially in the direction of arrows 2—2 of FIG. 1;

FIG. 3 is a sectional view taken substantially in the direction of arrows 3—3 of FIG. 1, with certain components eliminated;

FIG. 4 is a fragmentary sectional view of a portion of FIG. 1, including a diagrammatic showing of hydraulic pressure variations in the bearing structure;

FIG. 5 is a diagrammatic illustration of the bearing structure and hydraulic system embodying the invention;

FIG. 6 is a sectional view illustrating a modified form of the invention; and

FIG. 7 is a fragmentary sectional view taken substantially along the lines 7—7 of FIG. 6.

DESCRIPTION OF THE PREFERRED EMBODIMENTS

Referring more particularly to the drawings, the invention is shown in FIGS. 1–3 as comprising a bearing, spindle and support assembly 10 and a spindle 11, rotatably supported within a housing or support 12 by an ordinary sleeve bearing 13 adjacent the cutting tool end of the spindle and a spherical hydrostatic bearing 14 according to the invention adjacent the drive end of the spindle.

The cutting tool end of spindle 11 includes an enlarged portion 15 received within the bearing member 13, the enlargement providing for a conical shaped opening 16 (dotted lines) for receiving the shank of a cutting tool. Spindle 11 is hollow and has disposed therein a rod 17 for holding a cutting tool shank at the end 18, the rod threadedly receiving a nut 19 at its other end for holding it in place. The drive end of spindle 11 includes a portion 21 on which a toothed drive gear or pulley 22 may be fixed, as by a key 23. The teeth on pulley 22 are shown by the reference character 24 and are adapted to engage correspondingly shaped and spaced teeth 25, forming part of a flexible (for example, rubber) wire reenforced timing belt 26.

The spherical bearing 14 comprises a runner 27 and two outer bearing elements 28 and 29. The runner 27 has a convex, spherical outer surface, is hardened steel, has a bore so as to snugly fit on shaft portion 31, and is toroidal in shape, being truncated so as to provide a shoulder at one end for abutment against a shoulder 32 at one end of shaft portion 31. The opposite end of toroidal runner 27 also is truncated for abutment against a ring or sleeve 33 for holding the runner in place. The ring 33 is held in place by a collar 34 which may be threaded on the shaft portion 31 and held by means of a set screw 35, as shown. Other means of holding runner 27 in place may be used. The toroidal runner 27 is rotatably fixed relative to the shaft portion 31 by a key 36 suitably disposed in keyways in shaft portion 31 and the interior bore of the toroidal runner.

The outer bearing elements 28 and 29 are toroidal rings, in effect, having concave spherical bearing surfaces 37 and 38, respectively, finished to conform to the spherical mating surface 39 of the toroidal runner. Outer bearing element 28 has its exterior surfaces squared so as to firmly abut against a support surface 41 as part of housing 12. The outer bearing element 29 is disposed with its spherical bearing surface 38 facing the spherical bearing surface 37, has its exterior surfaces squared so as to be received in an appropriate opening in housing 12 and is accurately held in place by a thrust bearing retainer ring 42, the latter being held in place by an end member 43 attached to housing 12 by appropriate screws 44. The concave spherical bearing surfaces 37 and 38 are concentric with the spherical bearing surface 39, and are matched to a radius equal to or slightly greater than the radius of surface 39. Equal radii, of the bearing surfaces 37, 38 and 39, may be obtained economically by lapping. Alternatively, the bearing surfaces 37 and 38 may be machined to a radius slightly larger than that of bearing surface 39.

During assembly, bearing member 28 is placed in position against abutment 41, shaft 11 with bearing runner 27 attached is put into place with bearing surface 39 disposed against bearing surface 37, and bearing member 29 is put into place with its bearing surface 38 disposed against bearing surface 39. The thickness of ring 42 is selected so as to hold bearing surfaces 37 and 38 with the proper clearance relative to bearing surface 39 when the end member 43 is firmly attached by screws 44. As shown, bearing members 28 and 29 do not touch, but a space 45 is provided therebetween to enable the two bearing members to be adjusted relative to each other, if necessary, and to provide an avenue for outward flow of hydraulic lubricant during operation.

Referring to FIG. 3, it will be seen that the bearing surface 38 of bearing member 29 is divided into four symmetrically disposed areas or pads 38a, 38b, 38c and 38d, which are separated from each other by four pressure relieving grooves 46 cut into the bearing surface 38. The pressure relieving grooves 46 communicate with avenue 45 at one side of bearing member 29 and with the space inside of bearing cap 43 at the other end, from which avenue and space the lubricant can flow by gravity, for example, to a sump. Each bearing pad surface 38a, 38b, 38c and 38d is provided with a circular slot 47a, 47b, 47c and 47d, respectively, to each of which slots there is an inlet hole communicating with pipes 48a, 48b, 48c and 48d, respectively, for supplying lubricant under pressure.

Similarly, to the bearing member 29, reference being made to FIGS. 2 and 5, the bearing surface 37 of bearing member 28 includes a series of four symmetrically disposed bearing pad areas 49a, 49b, 49c and 49d, opposite to the bearing pad areas 38a, 38b, 38c and 38d. The bearing pad areas 49a, 49b, 49c and 49d are separated from each other by pressure relieving grooves 50, and each pad includes a circular slot 60a, 60b, 60c and 60d, respectively. The latter circular slots communicate with pipes 62a, 62b, 62c and 62d, respectively, for supplying lubricant under pressure to the bearing surface pads 49a, 49b, 49c and 49d. In FIG. 5, the bearing members 28 and 29, together with the bearing pad surfaces, pressure-relieving grooves, slots to which lubricant under pressure is supplied and pipes or conduits are shown diagrammatically. Thus, as to bearing member 29, slot 47a receives lubricant under pressure through pipe 48a, pipe 51a, flow control valve 52a, supply pipe 53 and check valve 54 from pump 55.

Pump 55 receives lubricant under pressure from a source or sump 56 and is driven by a motor 57. A pressure relief valve 58 is connected with the pressure side of pump 55, thereby limiting the pump pressure to a predetermined maximum.

Similarly, slot 47b is connected through pipe 51b and a flow control valve 52b to the pressure supply line 53, slot 47c is connected through flow control valve 52c to line 53 and slot 47b is connected through flow control valve 52d to line 53. Likewise, as to bearing member 28, the slots 60a, 60b, 60c and 60d are connected through flow control valves 59a, 59b, 59c and 59d, respectively, to the supply line 53, as shown diagrammatically in FIG. 5.

The flow control valves 52a, 52b, 52c, 52d and 59a, 59b, 59c and 59d may be of well-known commercially available types for regulating the volume of flow, shown schematically in FIG. 5 as a check valve and a variable valve. These valves may be of the temperature-pressure-compensated-type, and in some instances, particularly after the system has been calibrated, may be replaced by calibrated capillary tubes or orifices.

For a further understanding of the structure and operation, reference is made to FIG. 4, wherein the toroidal spherically surfaced runner 27 is shown disposed inside of the toroidal ring bearing members 28 and 29. Between the spherical bearing surfaces 37 and 38 of bearing members 28 and 29, respectively, and the spherical bearing surface 39 of runner 27 there is shown a space 61, somewhat exaggeratedly representing the clearance between the stationary and moving bearing surfaces during operation, the arrows A and B representing the flow of lubricating oil. Opposite the slots 47b and 47d of bearing member 29 and slots 60b and 60d of bearing member 29 (FIG. 4), there is shown a series of arrows C of varying lengths, illustrating variations in pressure of the lubricant as it moves from the oil supplying grooves or slots through the clearance between the bearing surfaces to the pressure-relieving grooves, the space 45 and the space at the ends of the bearing. Thus, the lubricant pressure is greatest at the point of entrance, for example, 1,500 pounds per square inch, and is least at the exits, for example, about 500 pounds per square inch.

During operation of the spindle 11, whether under cutting load or under no load, it may be assumed in the first instance that the oil pressure to all of the lubricant supply slots in the bearing sill pads 38a, 38b, 38c and 38d and 49a, 49b, 49c and 49d is equal, thereby maintaining uniform high pressure and a uniform flow volume of lubricant in the clearance 61 between the cooperating bearing surfaces. The spindle, accordingly, remains centered and runs true. If some force, such as at the cutting tool edge, or any other force, tends to cause the spindle to deflect radially, as shown by the arrows D in FIG. 4, the clearance between the bearing surfaces will decrease in the area away from the point of force application and will increase in the area of force application. The increased clearance permits a greater flow of lubricant, and the decreased clearance decreases the flow. The increased flow in the area of increased clearance is restricted by the setting of the appropriate flow control valves. The pump 55, however, has sufficient capacity to supply the maximum flow permitted by the flow control valves connected to the slot and the increased clearance between the bearing surfaces adjacent the area of force application and, additionally, to supply full or maximum pressure and increased lubricant flow to the slot and the diminished clearance between the bearing surfaces opposite to the area of force application. Under this pressure and flow, the bearing runner 27 is moved to its central, or balanced position where the pressure and flow at all supply slots are equal.

Similarly, if the spindle 11 is deflected by a force in the axial direction, as shown by the arrows E of FIG. 4, the clearance between bearing surfaces 61 decreases at the area opposite to the point of force application and increases at the area adjacent the point of force application. As already described for radial deflections, the flow of lubricant increases at the areas where the clearance 61 increases, but is limited in total flow by the setting of the flow control valves connected to the particular oil supply slots, but the full pressure and increased flow is available to exert force against the bearing runner 27 in the area where the clearance 61 has decreased. Again, under such increased pressure applied, the bearing runner 27 centers itself, whereby the pressure and flow at all points are balanced.

During startup, assuming no external load and that the spindle 11 is vertical in FIG. 1, the runner 27 rests on the bearing pads 49a, 49b, 49c and 49d due to the weight of the runner, spindle, etc. The clearance between the runner 27 and the bearing pads 38a, 38b, 38c and 38d is greater than normal due to the indicated displacement. The increased pressure available at the former pads displaces the runner to a more central position where the lubricant pressure is balanced on all the bearing pads.

In summary, when either external radial or thrust loads displace the runner from the one operating position, increasing clearances in pad areas adjacent the load application cause flow increase with consequent pressure drop. Automatically the higher pressure in pad areas diametrically opposite to the load compensate for the pressure and load difference and restore the runner to approximately its original operating position.

It has been found that an inlet lubricant pressure having a magnitude of about 1,500 pounds per square inch and an outlet pressure of about 500 pounds per square inch results in finishes of the order of 12 microinches r.m.s. when the cutting tool attached to spindle 11 has its cutting edge running at about 600 feet per minute when machining the metal titanium.

Oil pressure sealing rings 63, 64 and 65 are disposed around shaft portion 15 and interiorly of housing 12.

For example, the material of the spherical runner 27 may be steel and that of the rings 28 and 29 may be bronze. These metals prevent galling while turning in the event of a lubrication failure. However, since the bearing operates without actual contact between mating parts, other metals and plastics capable of withstanding the loads would also be suitable.

The bearing load carrying capacity is a function of the lubricant pressure, total bearing area, shape of the pad periphery, slot or recess shape and the ratio of recess to pad sizes. The flow volume is a function of these factors plus lubricant film thickness and lubricant viscosity. The bearing power efficiency appears highest with large included angles and recess to periphery angle ratios (approx. 0.5). The relationship of the load, flow and power relative to bearing load capacity may be expressed in the form of coefficients, one source of which is Cast Bronze Hydrostatic Bearing Manual of the Cast Bronze Bearing Institute, via Wisconsin Centrifugal, Inc., Waukesha, Wis.

Referring to FIGS. 6 and 7, there is shown a bearing system similar to that described, the essential difference being that the hydrostatic bearing is positioned on the spindle 11 adjacent the cutting tool end thereof, that is, on the portion 15 of the spindle 11. Also, the lubricant under pressure is supplied to the bearing members 28 and 29 through holes and bores 66, 67, 68, 69, 71, 72, 73 and 74 in housing 12. In these figures, the same reference characters are used for parts corresponding to those in the other figures. The toroidal runner 27 and toroidal ring bearing members 28 and 29 are similar in form and characteristics to the correspondingly numbered parts described in connection with FIGS. 1–5. The runner 27 is held in position against a shoulder on the shaft by a spacer ring or collar 33a, a threaded collar 34a and set screw 35a. The bearing functions in the same manner as described for FIGS. 1–5, but has the advantage that the restoring force is closer to the cutting tool and thus more easily can provide a corrective effect.

The advantages of a bearing according to the invention are high load-carrying capacity at all speeds (including zero speed), minimum starting friction and extremely low-running friction, no metal-to-metal contact at any operating speed within the design load limitations, and predictable and adjustable bearing performances with regard to load displacement characteristics, frictional drag, temperature rise and stiffness.

While particular embodiments of the invention have been shown, it will be understood, of course, that the invention is not limited thereto since many modifications may be made, and it is, therefore, intended to cover any such modifications as fall within the true spirit and scope of the invention.

The invention having thus been described, what is claimed and desired to be secured by Letters Patent is:

1. A spherical hydrostatic bearing for handling radial and axial loads applied between a rotatable shaft and a housing structure comprising first bearing means having an exterior spherical bearing surface, said first bearing means being affixed to and rotatable with the shaft; a second bearing means having a pair of axially spaced ringlike bearing members disposed in substantially enveloping relation with respect to the exterior bearing surface of said first bearing means, each ringlike bearing member being affixed to the housing structure and having an interior spherical surface interrupted by a plurality of symmetrically arranged arcuate openings through which high-pressure hydraulic fluid is introduced between the exterior surface of said first bearing means and the interior surface of said ringlike bearing members whereby said surfaces are separated by a thin film of hydraulic fluid, said arcuate openings being arranged in pairs and the openings of each pair being in substantially diametrically opposed relation, and a fluid pressure relieving port formed only in the interior spherical bearing surface of said second bearing means and disposed intermediate and spaced from predetermined arcuate openings and extending to the space formed between said ringlike bearing members; and means for supplying balancing hydraulic fluid pressure to said arcuate openings through communicating passageways formed only in said second bearing means.

2. The invention according to claim 1 including a sleeve bearing member between said shaft and said housing and spaced axially from said first and second bearing means.

3. The bearing of claim 1 wherein the hydraulic fluid introduced between the first bearing means and the ringlike bearing members has a pressure of about 1,500 pounds per square inch.

4. The bearing of claim 1 wherein the means for supplying the hydraulic fluid pressure includes flow control valves, a hydraulic pressure pump, and a plurality of passageways formed in said housing structure and communicating with the passageways formed in said second bearing means.

5. The bearing of claim 4 wherein a flow control valve is disposed in the hydraulic supply means for each arcuate opening.

6. The bearing of claim 4 wherein the capacity of said hydraulic pressure pump is in excess of the setting of any flow control valve.

* * * * *